United States Patent [19]

LeGrand et al.

[11] 4,455,170

[45] Jun. 19, 1984

[54] METHOD OF UPGRADING ROCK AND TREATED ROCK OBTAINED THEREFROM

[75] Inventors: Donald G. LeGrand, Burnt Hills; George M. Banino, Rexford, both of N.Y.

[73] Assignee: General Electric Company, Schenectady, N.Y.

[21] Appl. No.: 475,795

[22] Filed: Mar. 16, 1983

[51] Int. Cl.³ .................. C04B 31/42; C04B 31/44
[52] U.S. Cl. .................. 106/97; 106/98; 106/308 N; 428/403; 428/404; 428/540
[58] Field of Search ............ 106/97, 98, 308 N; 428/403, 404, 540

[56] References Cited

U.S. PATENT DOCUMENTS 4,256,501 3/1981 Banino .................. 106/97
4,341,824 7/1982 LeGrand .................. 106/90
4,410,367 10/1983 LeGrand .................. 106/308 N

OTHER PUBLICATIONS

Four Product Date Bulletins, Uniroyal Chemical, Division of Uniroyal, Inc.

*Primary Examiner*—James Poer
*Attorney, Agent, or Firm*—William A. Teoli; James C. Davis, Jr.; James Magee, Jr.

[57] ABSTRACT

A method is provided for upgrading rock in the form of aggregate, block, shaped stone or concrete structures involving the treatment of such rock with a dilute aqueous solution of polyelectrolyte and polyalkyleneglycol. Treated aggregate, portland cement and bituminous concrete compositions containing such treated aggregate are also provided.

16 Claims, No Drawings

METHOD OF UPGRADING ROCK AND TREATED ROCK OBTAINED THEREFROM

BACKGROUND OF THE INVENTION

Prior to the present invention, various methods were evaluated for treating rock to render the rock more resistant to environmental degradation. There have been many studies and methods of improving the quality of building stone and monuments, and limited study has been devoted to coarse aggregate quality improvement.

One study directed to aggregate improvement is shown by the interim report of May 1977, revised and updated January 1978, report PTI 7707 of the Pennsylvania Transportation Institute of Pennsylvania State University of P. V. Cady, "Upgrading of Poor or Marginal Aggregates for PCC and Bituminous Pavements." Various organic materials were evaluated as treating agents for improving the resistance of aggregate to degradation. Although valuable information has been generated from the aforementioned study, a satisfactory solution to the problem of aggregate degradation resulting from exposure to adverse environmental conditions including air pollution, moisture, or inorganic salt contact has not been found. Improvement has been noted by using organic materials, such as epoxy resins, methyl methacrylate, etc., to treat marginal aggregate, but the degree of aggregate upgrading achieved has not warranted the cost of using such material unless the organics were extensively diluted in polluting organic solvents.

Standard engineering tests can be performed to predict the quality of aggregate. One procedure, for example, has been the magnesium or sodium sulfate soundness test, ASTM C88-76. In many instances, local high quality course aggregate is not available for building construction and must be obtained at a high transportation cost. Various procedures have been used in an attempt to improve the quality of marginal or submarginal rock, for example, argillaceous limestone, highly crystalline limestone and graywacke sandstone to upgrade such material for use in portland cement or bituminous concrete. Procedures of the prior art have been found to be unacceptable because of economic or environmental reasons, or the treated rock failed to survive the magnesium or sodium sulfate soundness test.

Improved results have been achieved as shown by U.S. Pat. No. 4,256,501 of George M. Banino, based on the use of an organic solvent mixture of an organic condensation polymer and an aliphatic polyamine. However, organic solvent can present environmental pollution problem. In addition, the aforementioned aryl condensation polymer, for example, silicon-polycarbonate block polymers, for example, silicone-polycarbonate block polymers can significantly increase the cost of such treatment due to the expense of the starting reactants.

Additional improvements have been achieved with upgrading rock and aggregate by treating the rock with an aqueous polyelectrolyte solution having at least 1% by weight of polyelectrolyte, as shown by LeGrand, U.S. Pat. No. 4,341,824, assigned to the same assignee as the present invention and incorporated herein by reference. Although improved resistance to weatherability can be imparted to the resulting treated rock or aggregate, experience has shown that significant discoloration of the treated rock surface can often occur which may be the result of biological action. We have evaluated a variety of materials as possible "pore blockers" to improve the effectiveness of the aforedescribed rock treatment method.

The present invention is based on our discovery that polyglycols having a molecular weight in the range of from about 200 to 4000 will substantially enhance the weatherability of rock treated in accordance with our method shown in U.S. Pat. No. 4,341,824.

STATEMENT OF THE INVENTION

There is provided by the present invention, a method for upgrading rock having an average diameter of at least ¼" which comprises
(1) wetting the rock with an aqueous mixture of polyelectrolyte and polyglycol having at least 1% by weight of polyelectrolyte and form and from 1 to 10 part, per part of the polyelectrolyte of the polyglycol,
(2) allowing or effecting the drying of the resulting treated rock.

Additional aspects of the present invention relate to aggregate treated in accordance with the method of the present invention and reinforced portland cement compositions containing such treated aggregate.

Polyglycols which can be utilized in the practice of the present invention are more particularly a dihydroxyether formed by dehydration of two or more glycol molecules or diols which are a group of diatomic aliphatic alcohols, for example, aliphatic compounds containing two hydroxy groups, such as ethane diol. These polyglycols can have a M.W. in the range of about 100 to about 10,000 and preferably 400 to about 4,000. Additional polyglycols which can be used in the practice of the present invention are shown in Kirk Othmer, Encyclopedia of Chemical Technology, Glycols, Vol. 11, pages 933 to 971. 3rd Edition (1980), John Wiley and Sons, New York.

Included by the term "polyelectrolyte" as used in the practice of the present invention, is any water soluble ionic polymer in the form of either polyacid, polybase, or polyampholite, depending upon the nature of its ionization in water solution. A more comprehensive definition of the term polyelectrolyte can be found in the Encyclopedia of Polymer Science and Technology, Vol. 10, pp. 781–861 (1969) John Wiley & Sons, New York. The preferred polyelectrolytes are polyethyleneimine or polyalkylenepolyamine, manufactured by the Dow Chemical Company, Midland, Michigan, having a molecular weight in the range of from about 200 to about 1000. Some of the preferred polyelectrolytes are anhydrous polyalkylenepolyamine polymers (XD-3259.01) of the Dow Chemical Company, hereinafter referred to as "E-100," having the following characteristics:

| Property | XD-30259.01 |
| --- | --- |
| Formula | $H_2N(C_2H_4NH)_nH$ |
| Molecular weight | Approx. 250–300 |
| Boiling Range, °C. | >250° C. at 760 mm. Hg |
| Freezing Point, °C. | Below 40[1] |
| Specific Gravity, 25/25° C. | 1.0 |
| Pounds per Gallon, 25° C. | 8.46 |
| Flash Point, °F. | 425 Cleveland open Cup |
| Approximate Solubility grams Per 100 grams solvent at 25° C. | |
| Acetone | |
| Benzene | |

-continued

| Property | XD-30259.01 |
|---|---|
| Carbon Tetrachloride | Reacts Violently |
| Ethylether | |
| n-Heptane | <0.1 |
| Methanol | |
| Water | |

[1] Pour Point

Some of the following Quarternized polyalkylenepolyamines XD-30267, XD-30268, XD30269 and XD-30269.01 are also included:

| Property | XD-30267 | XD-30268 | XD-30269 | XD-30269.01 |
|---|---|---|---|---|
| % of Quaternization | 10 | 25 | 50 | 75 |
| Mol. Wt. | 40–80,000 | 40–80,000 | 40–80,000 | 40–80,000 |
| pH, $25 deg C$ | 9 | 8 | 8 | 8 |
| % Solids, Active | 35 | 35 | 35 | 35 |
| % Solids, Non-Volatile | 50.4 | 50.3 | 51.2 | 49.6 |
| Viscosity, cps, Brookfield RTV #3 Spindle at 100 RPM #3 Spindle at 50 RPM | 1502 | 478 | 167 | 55 |
| Specific Gravity, 25/$25 deg C$ | 1.152 | 1.161 | 1.163 | 1.164 |
| Pounds per gallon, $25 deg C$ | 9.6 | 9.67 | 9.7 | 9.7 |

Polyvalent metallic salts which can be used as gellation agents for polyelectrolyte treated aggregate in accordance with the practice of the present invention are salts of Group IIa, IIIa and IVa metals having anions selected from halides, acetates, sulfates, chromates, phosphates, etc. In order to determine whether a polyvalent metallic salt can perform effectively as a gellation agent, a dilute aqueous solution of the metallic salt, for example, a 10% solution can be added with stirring to a dilute aqueous solution of the polyelectrolyte. Gellation or precipitation of polyelectrolyte product indicates the polyvalent metallic salt is an effective gellation agent.

The term "rock" as employed in the description of the method of the present invention is intended to include stone, aggregate, block, concrete, having a diameter of at least $\frac{1}{4}''$ as well as existing stone structures, etc. More particularly, rock refers to those rocks containing 50% or more of siliceous minerals and those rocks containing 50% or more of carbonate minerals. Silicious rock is represented, for example, by dark gray, fine-grained graywacke sandstone with interbedded black shale layers and beds. Carbonate rocks are represented, for example, by medium crystalline metamorphic dolomitic marble; medium to dark gray, fine-grained dolomite to argillaceous dolomite with interbedded black shale partings; and an inter-reef deposit of nearby black, fine grained, argillaceous dolomite to shaley dolomite. In addition to these aggregate rock, those skilled in the art also would know that surface treatment of existing stone structures, for example, monuments, road surfaces, bridges, buildings, etc., having existing shaped stone surfaces also can be benefited and are included with the scope of the present invention. Existing bridge surfaces can be initially treated with the above described polyelectrolyte followed by a post treatment with the above described polyvalent metallic salt gellation agent. An example of building stone is a fine-grained graywacke sandstone which can be medium to dark gray to greenish gray.

The test method used to evaluate rock treated in accordance with the practice of the present invention is the sulfate soundness test. More specifically, the rock was tested in accordance with New York State Department of Transportation "Soundness of Course Aggregates by Magnesium Sulfate Solutions", test method New York 207 B-76. This test is based on the ASTM soundness of aggregates by use of sodium sulfate or magnesium sulfate test method C88-76. The New York State test method maintains a solution temperature of $75° \pm 1°$ F. Another significant distinction between the two tested methods is that the New York State test method is based on a 10 cycle test while the ASTM test is run on a 5 cycle test.

The term "aggregate" as utilized in the practice of the present invention includes crushed stone and gravel and can vary in size from approximately $\frac{1}{4}''$ to 4" in diameter. Preferably, the average diameter of the aggregate is $\frac{1}{4}''$ to $1\frac{1}{4}''$. It is preferred to utilize aggregate in the practice of the present invention in the substantial absence of unhardened cement, or any material falling outside of the aforedescribed aggregate definition which would interfere or compete with the surface treatment of the aggregate by the polyelectrolyte.

Aggregate utilized in the test method for evaluation is initially screened to separate out the fraction passing a $\frac{1}{4}''$ screen and retained on a $\frac{1}{4}''$ screen. The sized aggregate is then washed to remove any dust or coatings. The washed aggregate is then dried in an oven to constant weight at a temperature of $230°$ F.$\pm 90°$ F. The dried sample is then weighed to obtain a 2500 gram $\pm 50$ gram charge.

The dried aggregate is then placed into a wire mesh basket and immersed into the treating solution for about 30 seconds to 1 minute and agitated slightly to displace any air pockets. The basket is then removed from the solution of the composition and allowed to set for several minutes until little or no solution runoff is observed. The treated sample is then dried in an oven at a temperature of $230°$ F.$\pm 9°$ F. to a constant weight.

The treated sample is then tested for its ability to resist environmental degradation by immersing it while in a wire basket into a magnesium sulfate solution for 16–18 hours. After immersion, the sample is removed and allowed to drain for about 15 minutes and then placed into a drying oven which is at a temperature of $230°$ F.$\pm 9°$ F. The sample is then dried to $6\frac{1}{4}$ hours, completing one cycle. The process of alternate immersion and drying was repeated for 10 full cycles.

After completing the final cycle, the sample is washed free of any magnesium sulfate and then dried to a constant weight of a drying oven at a temperature of $290°$ F.$\pm 9°$ F. The dried aggregate is then resieved over $\frac{1}{4}''$ sieve and the weight recorded. The difference between the final weight and the original weight represents the loss due to "D" or "degradation". The "%D" is expressed as a percentage of the original weight.

In instances where blocks of stone are tested, a modification of the above-described aggregate test procedure is employed. Approximately cubical shaped blocks ranging from about 1½" to 3" on a side are separated from larger blocks whether by sawing or by breaking the stone with a hammer and chisel. The blocks are then either soaked in the test solution for up to one minute, or coated with the solution using a paint brush. The blocks are then placed in an oven at a temperature of 230° F.,±9° F. to constant weight. The prepared samples are then subjected to alternate immersion and drying for 10 cycles in the same manner as described above for the aggregate. Upon completion of the final cycle, the blocks are then washed free of magnesium sulfate and the %D is observed quantitatively in terms of percent weight loss based on the original weight of the sample.

In order that those skilled in the art will be better able to practice the invention, the following example is given by way of illustration and not by way of limitation. All parts are by weight.

EXAMPLE 1

An aqueous 10% solution of E-100 as previously described, was prepared by agitating a mixture of water and the polyalkylenepolyamine at a temperature of about 25° C.

Marble and limestone aggregate were classified in accordance with the above-described procedure of the New York State Department of Transportation "soundness of course aggregate by magnesium sulfate solutions" test method New York 207 B-76.

Various "pore blockers" were then evaluated by adding them at a concentration of about 0.001 to 2 parts of pore blocker per part of E-100. The resulting solutions were then used to treat the aggregate in accordance with the aforedescribed magnesium sulfate test method. The following results were obtained, where "loss" is the percent weight loss experienced by the aggregate after the magnesium sulfate treatment as compared to the original weight of the aggregate, "PEG" is polyethyleneglycol obtained from Dow Chemical Company, Midland Michigan, Ludox LS is colloidal silica obtained from the E.I. Dupont de Nemours Company, ND-2 and Z-1766 are anionic polyelectrolytes obtained from the Uniroyal Chemical Company, Naugatuck, Connecticut:

| | Solution | WT. Loss (%) |
|---|---|---|
| | 10% E-100 + .01% o-phenyl, phenol | 29.9 |
| | 10% E-100 + .01% penta chloro phenol | 27.3 |
| | 20% E-100 + 22% polyvinyl pyrolidine | 14.4 |
| | 10% E-100 + 2% vinyl pyridine | 38.1 |
| | 10% E-100 + 2% PEG 400 | 3.2–4.2 |
| | 10% E-100 + 2% Ludox LS | 40.5 |
| | 20% ND-2 | 75.8 |
| | 20% Z-1766 | 72.4 |
| No Treatment | | 70–90 |
| Control | 10% E-100 | 8–32.6 |

An additional evaluation of pore blockers was conducted to provide the following results:

| Solution | WT. Loss (%) |
|---|---|
| E-100 10% + 2% PEG 4000 | 10.6 |
| E-100 5% + 2.55 PEG 400 | 52.8 |
| E-100 5% + PEG 400 | 38.1 |
| PEG 400 10% | 81.9 |

| Solution | WT. Loss (%) |
|---|---|
| E-100 2.5% + 1.% PEG 400 | 81.4 |

The above results show that the combination of the polyethyleneglycol and the E-100 provide substantially improved resistance to the effects of environmental degradation in accordance with the magnesium sulfate soundness test 207 B-76 as described above.

Although the above example is directed to only a few of the very many variables utilized in the practice of the present invention, it should be understood that the present invention is directed to a method using a treating solution containing polyelectrolyte and polyalkyleneglycol which are more fully defined in the description preceding this example.

What we claim as new and desire to secure by Letters Patent of the United States is:

1. A method for upgrading rock having an average diameter of at least ¼" which comprises,
   (1) wetting the rock with an aqueous mixture of polyelectrolyte and polyglycol having at least 1% by weight of polyelectrolyte and form and from 1 to 10 parts, per part of the polyelectrolyte of the polyglycol,
   (2) allowing or effecting the drying of the resulting treated rock.
2. A method in accordance with claim 1, where the rock is aggregate.
3. A method in accordance with claim 1, where the rock is a preexisting stone or concrete structure.
4. A method in accordance with claim 1, where the polyelectrolyte is polyalkylenepolyamine.
5. A method for treating aggregate having an average diameter of at least ¼" in the absence of unhardened cement to upgrade the resistance of the aggregate to environmental degradation which comprises,
   (1) wetting the aggregate with an aqueous mixture of polyelectrolyte and polyalkyleneglycol having at least 1% by weight of polyelectrolyte which has a molecular weight of up to about 4,000 and the polyalkyleneglycol is present at about 1 to 10 parts, per part of the polyelectrolyte and
   (2) allowing or effecting the drying of the aggregate.
6. A method in accordance with claim 5, where the polyalkyleneglycol is polyethyleneglycol.
7. A method in accordance with claim 5, where the aggregate is limestone.
8. A method in accordance with claim 5, where the aggregate is marble.
9. A method in accordance with claim 5, where the aggregate is sandstone.
10. A method in accordance with claim 5, where the ionic polymer is polyalkylenepolyamine.
11. Aggregate having an average diameter of at least ¼" treated with a mixture of a water soluble polyelectrolyte and polyalkyleneglycol.
12. Limestone aggregate having an average diameter of at least ¼" treated with a mixture of a water soluble polyelectrolyte and polyalkyleneglycol.
13. Marble aggregate having an average diameter of at least ¼" treated with a mixture of a water soluble polyelectrolyte and polyalkyleneglycol.
14. Sandstone aggregate having an average diameter of at least ¼" treated with a mixture of a water soluble polyelectrolyte and polyalkyleneglycol.
15. A concrete composition comprising sand, portland cement and up to 90% by weight of aggregate treated with a mixture of polyelectrolyte and polyalkyleneglycol.
16. A concrete composition in accordance with claim 15, having about 45% by weight of aggregate treated polyelectrolyte and polyalkyleneglycol.

* * * * *